US006629106B1

United States Patent
Narayanaswamy et al.

(10) Patent No.: US 6,629,106 B1
(45) Date of Patent: Sep. 30, 2003

(54) EVENT MONITORING AND CORRELATION SYSTEM

(75) Inventors: Krishnamurthy Narayanaswamy, Los Angeles, CA (US); Deborah A. Taylor, Los Angeles, CA (US)

(73) Assignee: Computing Services Support Solutions, Inc., Los Angeles, CA (US)

(*) Notice: Subject to any disclaimer, the term of this patent is extended or adjusted under 35 U.S.C. 154(b) by 0 days.

(21) Appl. No.: 09/259,813

(22) Filed: Feb. 26, 1999

(51) Int. Cl.[7] ............................. G06F 7/00; G06F 17/00
(52) U.S. Cl. .................................................... 707/104.1
(58) Field of Search ...................... 707/3, 10, 7, 104.1, 707/6, 102; 709/201

(56) References Cited

U.S. PATENT DOCUMENTS

| | | | | |
|---|---|---|---|---|
| 5,661,668 A | * | 8/1997 | Yemini et al. | 702/186 |
| 5,748,884 A | * | 5/1998 | Royce et al. | 395/185.1 |
| 6,092,102 A | * | 7/2000 | Wagner | 709/206 |
| 6,119,103 A | * | 9/2000 | Basch et al. | 705/35 |
| 6,131,112 A | * | 10/2000 | Lewis et al. | 709/207 |

FOREIGN PATENT DOCUMENTS

EP 0747835 A1 * 12/1996

OTHER PUBLICATIONS

"Software Evolution Through Automatic Monitoring Cs3: Computing Services Support Solutions", www.darpa.mil/ito/psum1998/D931-0.html.*

* cited by examiner

Primary Examiner—Greta Robinson
Assistant Examiner—Susan Rayyan
(74) Attorney, Agent, or Firm—David A. Belasco; Belasco, Jacobs & Townsley, LLP

(57) ABSTRACT

The invention is a common event monitoring, fusion and reasoning framework that integrates horizontally into many different application domain areas. The system includes a monitor for detecting occurrences of predetermined events from a monitored system, providing data in response to the occurrence and processing the data as a data relation in a database. Predetermined events are recorded in a database using an event pattern language that defines and compiles events in terms of first order logic over a universe of events. The language provides common patterns that allow event patterns (i.e., event rules and relations) to be specified by the client dynamically. These specified event patterns are then compiled into the database. The compiled code automatically triggers responses when specific event patterns are stored in the database. After compilation, additional event patterns may be recognized dynamically by formulating queries into the database using a standard query language such as SQL.

14 Claims, 5 Drawing Sheets

EVENT MONITORING AND CORRELATION SYSTEM

BACKGROUND OF THE INVENTION

1. Field of the Invention

The present invention relates to computer software. More specifically, the present invention relates to software based event monitoring systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

With the distributed nature of computing, there is a current need for an ability to make decisions based on the occurrence of events detected from multiple sources. The correlation of events from multiple distributed sources lies at the heart of decision support systems of today. Events form a simple, yet convenient common formalism to unify reasoning about the state of the different applications in the computing world, which is increasingly heterogeneous and distributed.

Conventional event correlation systems simply provide an alarm based on the occurrence of prescribed events. A need has been recognized in the art for a more sophisticated, software based, event correlation capability.

Inasmuch as current event correlation systems generally do not provide such a more sophisticated correlation capability, particularly with respect to time based events with or without intelligent filters, a need exists in the art for a more powerful event correlation capability. There is a particular need for a more powerful software based event correlation system.

SUMMARY OF THE INVENTION

The present invention is a powerful event monitoring and correlation system and technique. Most generally, the inventive system includes a monitor for detecting the occurrence of a predetermined event from a monitored system and provides data in response thereto. The data is then processed as a data relation in a database.

In the illustrative embodiment, a plurality of predetermined events are recorded in a database using an event pattern language. The event pattern language expresses events in terms of first order logic (FoL) over a universe of events. In the preferred embodiment, the event pattern language is a Formal Language for Expressing Assumptions (FLEA). FLEA is an event pattern specification language that allows for events to be defined and compiled in first order logic. In addition, FLEA includes a number of commonly occurring patterns which allow additional event patterns (i.e., event rules and relations) to be specified by the client dynamically.

The specified patterns of events and event relations are then compiled into the database using an event compiler. The compiled code then automatically triggers responses when specific patterns of events are stored in the database. In the preferred embodiment, the event compiler is a Software Monitoring System (SoMoS) compiler.

The invention is a common event monitoring, fusion and reasoning framework that integrates horizontally into many different application domain areas. For example, the invention may be utilized to monitor criminal activity over the Internet or World Wide Web and automatically trigger appropriate alarms and other responses in real time.

The present invention does for events what relational databases do for stored data in different domains. In accordance with the present teachings, data is recorded as relations allowing one to dynamically formulate queries in a standard language regardless of what the relation means in domain terms. Similarly, in accordance with the present teachings, events are recorded as relations in a database permitting a recognition of many kinds of events patterns by querying the event database. The invention generates a database that is believed to be superior to databases in the marketplace in areas such as supporting triggered computations and constraint enforcement. With the inventive event compiler compiling new event patterns into new "defined" relations in the inventive database, one can automatically trigger responses when specific patterns of events are recorded in the database. This greatly simplifies the programming of reactive applications, eliminating the need for polling and other awkward control regimes.

DESCRIPTION OF THE INVENTION

Illustrative embodiments and exemplary applications will now be described with reference to the accompanying drawings to disclose the advantageous teachings of the present invention.

As discussed more fully below, the inventive system includes a monitor for detecting the occurrence of a predetermined event from a monitored system and provides data in response thereto. The data is then processed as a data relation in a database. In the illustrative embodiment, a plurality of predetermined events are recorded in a database using an event pattern language. The event pattern language expresses events in terms of first order logic (FoL) over a universe of events. In the preferred embodiment, the event pattern language is a Formal Language for Expressing Assumptions (FLEA). FLEA is an event pattern specification language that allows for events to be defined and compiled in first order logic. In addition, FLEA includes a number of commonly occurring patterns which allow additional event patterns (i.e., event rules and relations) to be specified by the client dynamically.

The specified patterns of events and event relations are then compiled into the database using an event compiler. The compiled code then automatically triggers responses when specific patterns of events are stored in the database. In the preferred embodiment, the event compiler is a Software Monitoring System (SoMoS) compiler.

After events are compiled in the database, additional event patterns may be recognized simply and dynamically by formulating queries into the database using a standard query language such as SQL.

Figure 1:
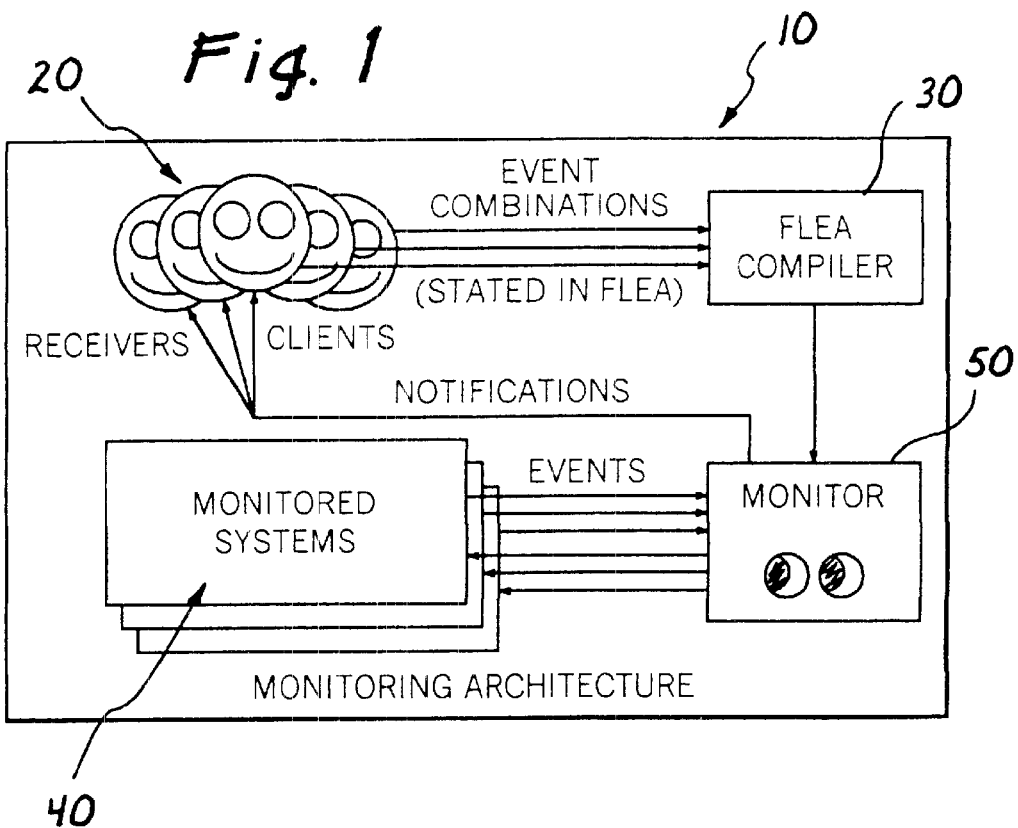
FIG. 1 is a block diagram which illustrates the basic architecture of the system of the present invention.

FIG. 1 is a block diagram which illustrates the basic architecture of the system of the present invention. The architecture 10 includes a number of clients 20 which specify events, patterns (i.e., event rules and relations) or combinations in an event patterning language. In the preferred embodiment, the event pattern language is a first order event patterning language such as FLEA—Formal Language for Expressing Assumptions. FLEA implements First Order Logic over a universe of events, with a few additional commonly occurring event patterns built in to allow clients 20 to quickly and easily specify new event patterns dynamically. The FLEA language is defined in Appendixattached hereto.

The specified patterns of events and event relations are then compiled into a database using an event compiler 30. The compiled code then automatically triggers responses when specific patterns of events are received from monitored systems 40 and recorded in the database running on a monitor 50 which serves as the SoMoS server. The system of the present invention is adapted for use with one or more monitored systems 40. The monitored systems 40 are emanating the events of interest in some domain. These are the events that decision makers are presumably trying to correlate. These systems must be instrumented to communicate events to the SoMoS server 50.

In the preferred architecture, the server or reasoning component resides on a different computer from the client program (of which there may be several). The server program runs on a host computer that can be a PC or a larger workstation. The clients in this software architecture are themselves stand-alone programs that play the role of event emitters, event definers, and event receivers. In the illustrative embodiment, the event compiler 30 is a Software Monitoring System (SoMoS) compiler. The SoMoS compiler is implemented as a single program running on a single host server, or monitor, 50 (which serves as the reasoning engine). The client programs can be spread out anywhere in the world, with the only restriction that they be able to communicate over the Internet using a sockets-based protocol with the SoMoS server program. This is shown in FIG. 2.

Figure 2:
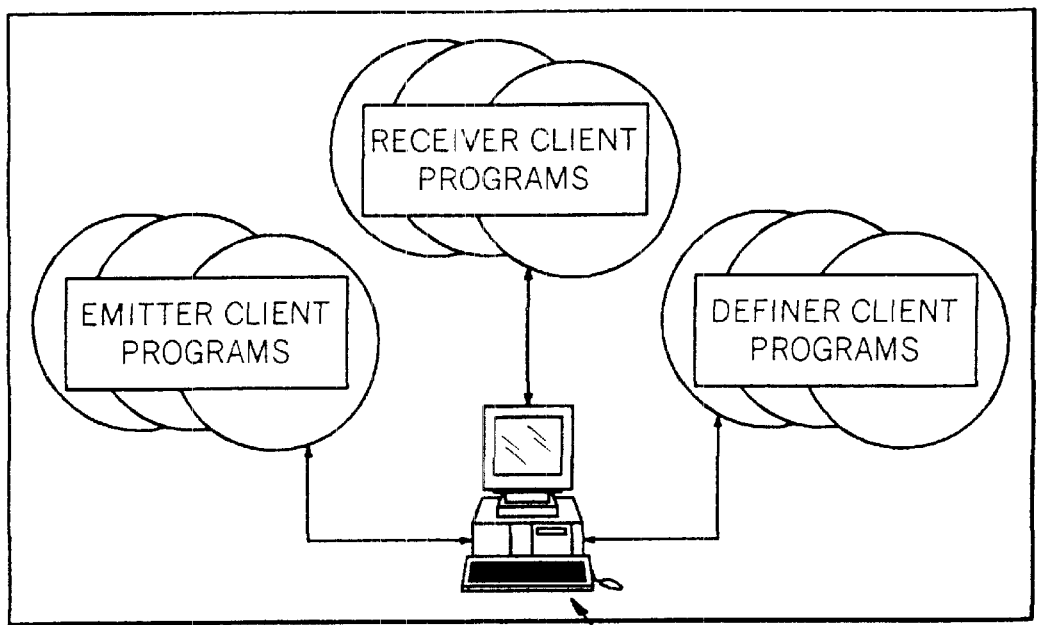
FIG. 2 is a diagram which illustrates the operation of the SoMoS compiler of the present invention.

FIG. 2 is a diagram which illustrates the operation of the SoMoS compiler of the present invention. There are several broad kinds of events that SoMoS handles:

1. External events: these are events that occur in the world. All such events are time stamped, and once asserted cannot be retracted. Events can have other data associated with them in addition to time stamps. For example, an earthquake event can record not just when it occurred, but the magnitude, and the location of the epicenter.
2. Definition events: these are complex event patterns defined by First Order Logic in the event patterning language. These events represent correlations between other, typically more primitive, events. For example, the event that two earthquakes occurred in the same 24 hour period is itself another event.
3. Transition events: these are events defined by database conditions—e.g., when the number of earthquakes in a 24 hour period exceeds 10.

Many event notification systems can handle item 1. Very few can handle 2 and 3. In any event, none are known to do so using the innovative event compiler of the present invention.

As depicted in FIG. 2, the monitor 50 has a traditional client/server flavor if one views the reasoning engine as the server. However, it may be more useful just to view SoMoS as a service and the various roles that "clients" of SoMoS might play in the architecture, characterizing the different ways in which one might interact with clients:

Event Definers: These are clients that send the server definitions of new classes of events—new external, defined, or transition events. These are operationalized (compiled) automatically into the monitor.

Event Receivers: These are clients that request the server to notify them about occurrences of specific event classes, primitive or derived.

Event Emitters: These clients notify the server about occurrences of specific primitive event classes. Emitters result from instrumenting the monitored systems so that external events can be forwarded to the monitor.

Figure 3:
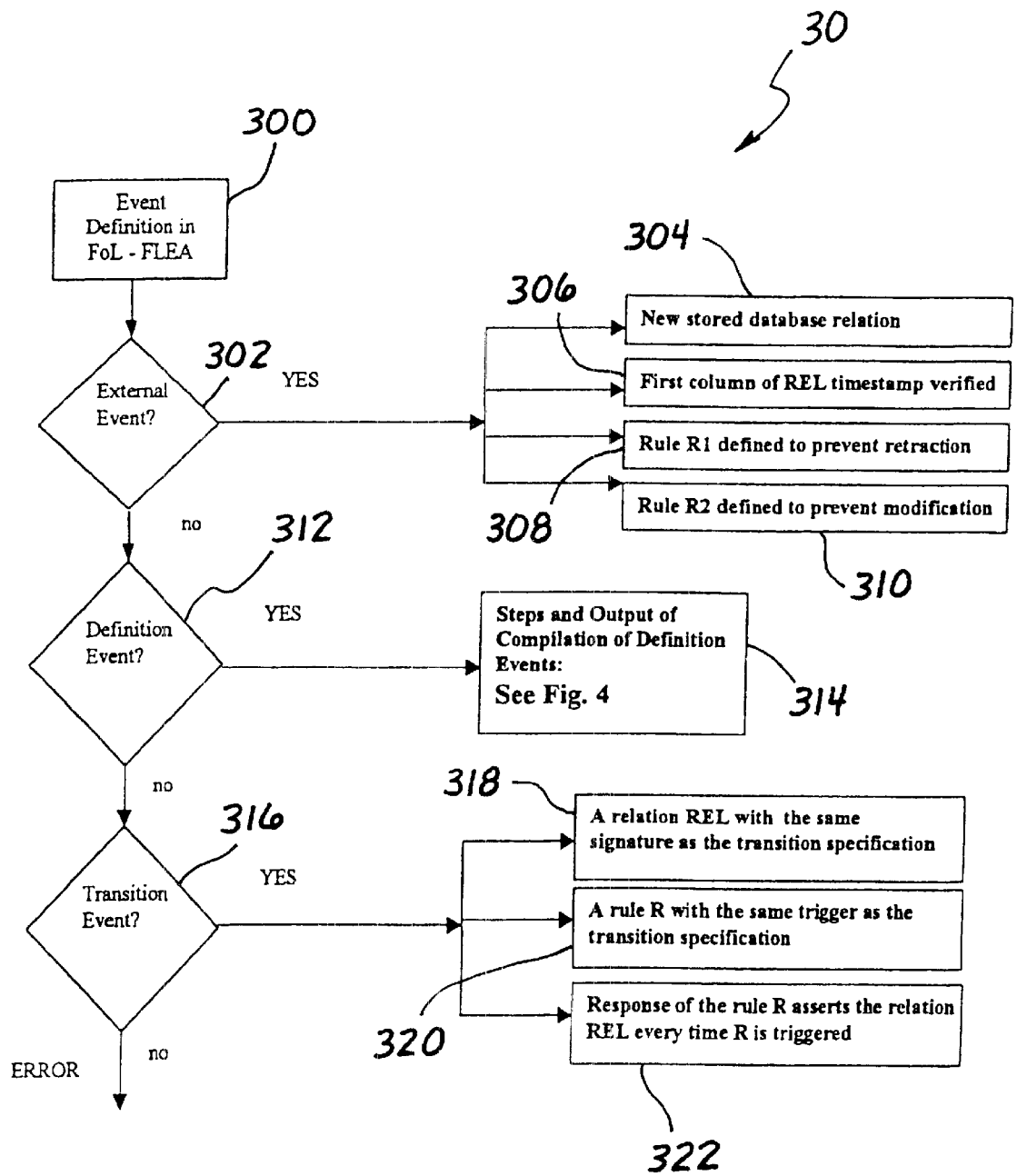
FIG. 3 is a flow diagram of the SoMoS event pattern compiler of the present invention.

FIG. 3 is a flow diagram of the SoMoS event pattern compiler 30 of the present invention. As illustrated in FIG. 3, the compilation routine 30 begins with event definition in the event pattern language, e.g. FLEA, at step 300. At steps 302, 312 and 316, the routine checks an event indication received from a client and checks to determine whether it is an external event, a definition event or a transition event, respectively. If, at step 302, the detected event is recognized as an external event, at step 304 a new database relation is defined accordingly. The first column of the relation is time stamp verified at step 306. At steps 308 and 310 a rule R1 is defined to prevent retraction and a rule R2 is defined to prevent modification, respectively. Illustrative outputs corresponding to each of the steps in the compilation (304–310) are as below:

Consider the generic external event, where type1, type2, ..., type-n are the types of the individual columns of the event:

(defevent e :external (timestamp type1 type2 ..., type-n))

The above event is translated per steps 304–310 as below:

```
Step 304: Defines a new database relation "e" with the same signature as
the event "e"
(defrelation e :types (timestamp type1 type2 ... type-n))
Step 306: Timestamp checking on the first column type
(if (not (eq (first (fourth form)) 'timestamp))
    (reject-definition form))
Step 308: Rule R1 to prevent retraction of tuples of "e"
    (neverpermitted retract-e
        (E (ts a1 a2 ... a–n)
            (start (not (e ts a1 a2 ... a–n)))))
Step 310: Rule R2 to prevent modification of tuples of "e"
    (neverpermitted modify-e
        (E (ts a1 a2 ... a–n)
            (and (e ts a1 a2 ... a–n)
                (E (b1 b2 ... b–n) s.t.
                    (start (not (e ts b1 b2 ... bn))))))))
```

The above outputs are the result of detecting an external event at step 312, and translation of such events.

Figure 4:
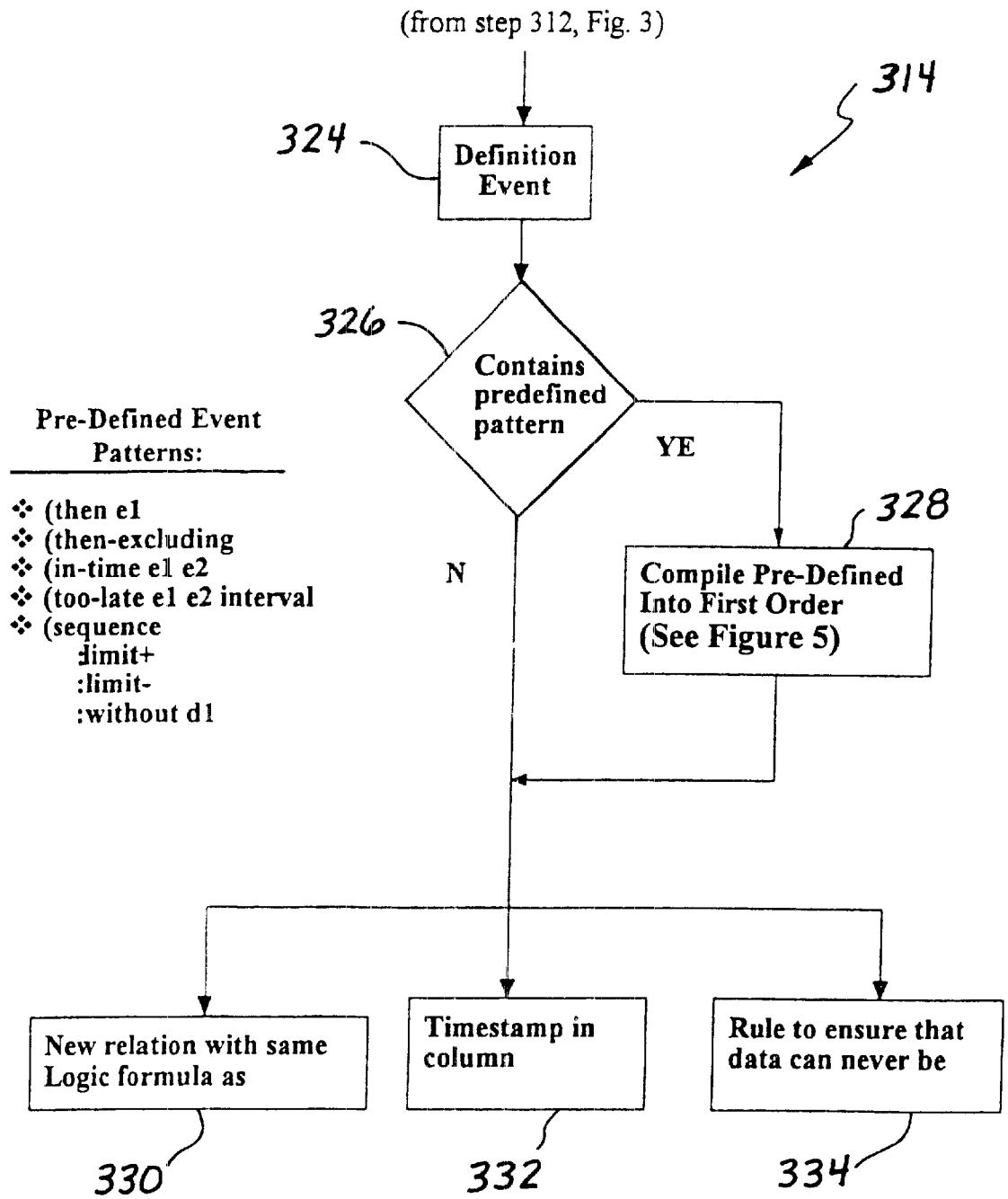
FIG. 4 is a flow chart of the definition event compilation process utilized in the event pattern compiler of the present invention.

If a definition event is detected at step 312, then at step 314 the definition event is compiled in accordance with the process detailed in FIG. 4.

FIG. 4 is a flow chart of the definition event compilation process utilized in the event pattern compiler of the present invention. As illustrated in FIG. 4, at step 324, the definition event is received and at step 326 the event is checked for predefined patterns. The predefined event patterns are stored in a database. An illustrative event pattern definition is shown in FIG. 4. If a predefined event pattern is detected, then at step 328, the pattern is compiled into first order logic. This process is illustrated in detail in FIG. 5.

Figure 5:
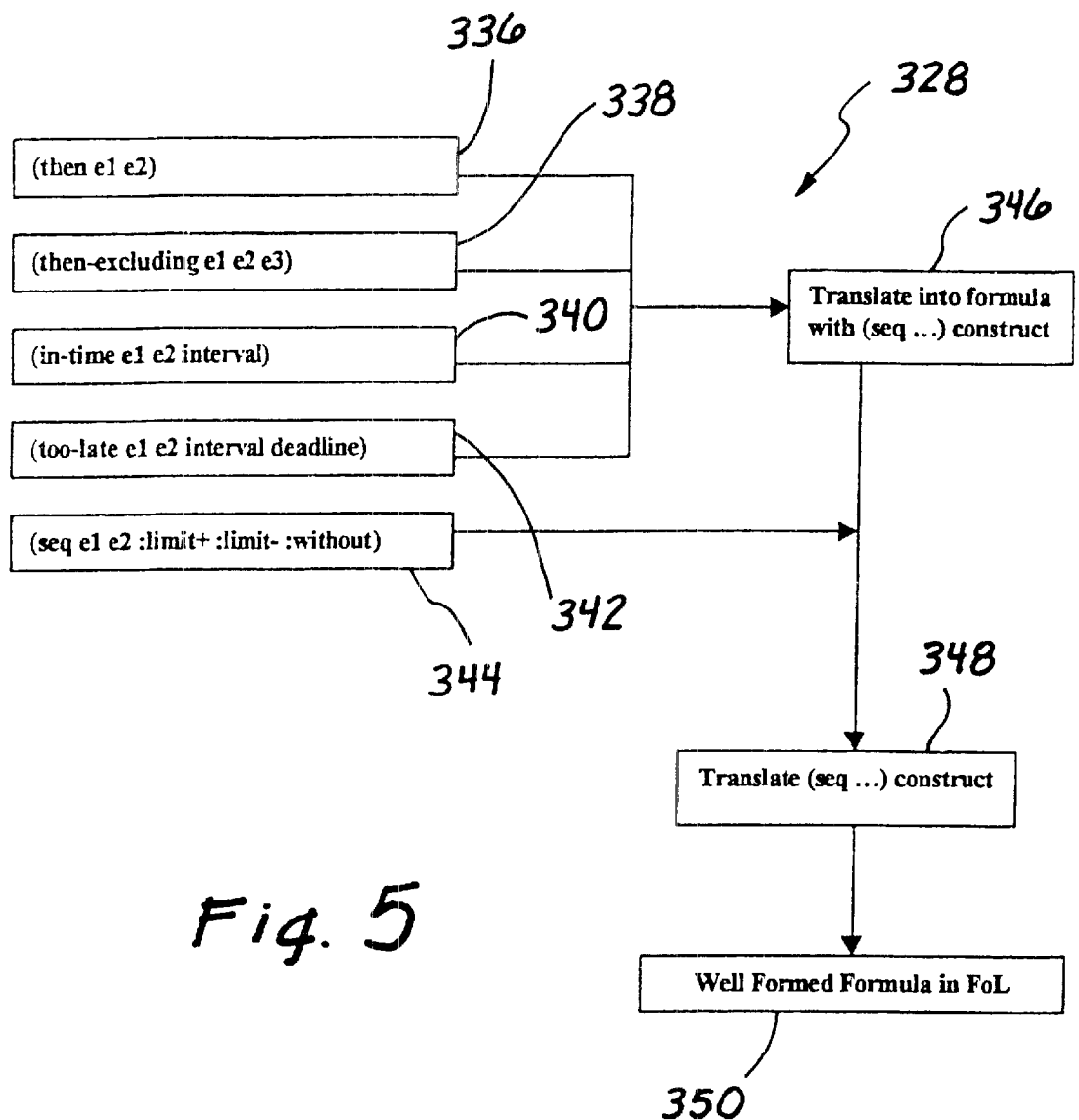
FIG. 5 is a flow diagram which illustrates the translation of pre-defined patterns into first order logic by the event compiler utilized in the present invention.

FIG. 5 is a flow diagram which illustrates the translation of pre-defined patterns into first order logic by the event compiler utilized in the present invention. In FIG. 5, at steps 336–344 (even numbers only) a pattern match is performed to determine which pre-defined event has been detected. If any of these steps is true, then at step 346, the event is translated into a formula such as formula [1] below:

```
(defevent two-e-events-within-an-hour
    :definition
    ((timestamp a1 a2) s.t.
    (in-time (e timestamp a1 a2 $ ... $)
        (e $ a1 a2 $ ... $)
        3600)))                                              [1]
```

Pre-defined event patterns, such as "in-time" above, are translated into a common intermediate notation using the (SEQ . . . ) construct. Various pre-defined event patterns translate into equivalent (SEQ . . . ) patterns. The result of each of the steps 336–344 will thus be an equivalent formula that contains only (SEQ . . . ) in it. The formula [1] above would be detected as an "in-time" pre-defined event in Step 340, for example, and the resulting output would be:

```
(defrelation two-e-events-within-an-hour
    :definition
    ((timestamp a1 a2) s.t.
    (SEQ :LIMIT+ 3600
        (e TIMESTAMP a1 a2 $ ... $)
        (e $ a1 a2 $ ... $))))                               [2]
```

At step 348, the intermediate event pattern containing (SEQ . . . ) is compiled into actual First Order Logic. Consequently, at step 350, a well formed formula is output in first order logic (FoL). The output of Step 348 for the formula [2] above, for example, would be as below:

```
(defrelation two-earthquakes-within-an-hour
    :definition
    ((timestamp a1 a2) s.t.
    (E (DEADLINE1459 TIME1458)
        (AND (e TIMESTAMP a1 a2 $ . . . $)
            (e TIME1458 a1 a2 $ . . . $)
            (<TIMESTAMP TIME1458)
            (AND (+ TIMESTAMP 3600 DEADLINE1459)
                (< TIME1458 DEADLINE1459))))))               [3]
```

Formula [3] is pure First Order Logic, and is now ready to be defined as a derived relation.

If the event specification is not found to contain pre-defined patterns in Step 326 of FIG. 4, then the formula is simply carried forward as a legal FoL event pattern specification.

Returning to FIG. 4, at steps 330, 332 and 334: in Step 330, the new relation is created with a first order logic formula that is equivalent to the original definition event (e.g., the relation defined in Formula [3] above if translation is required from a pre-defined event pattern in Step 328, or the actual FoL event pattern specification supplied in the definition event). Specifically, timestamp is verified in step 332 using the same output code as in Step 306, and a rule is created to ensure that the relation data can never be retracted in Step 334 using the same output code as in Step 308 respectively. In other words, Steps 332 and 334 are materially the same as Steps 306 and 308 respectively. Steps 330, 332, and 334 as just described complete the processing of both predefined and general definition events as detected in Step 316 of FIG. 3.

Returning to FIG. 3, at step 316, if the event specification being translated is not an external event, or a definition event, the compiler 30 determines whether or not the received event is a transition event.

If at step 316, the event specification is found to be a transition event, translation proceeds through steps 318, 320 and 322. At Step 318, a new relation is defined with the same relation as the transition specification. At Step 320, a rule is created with the same trigger as in the transition event specification. In Step 322, the response of the rule is set up so that the relation is asserted automatically every time the rule is triggered, respectively. Each of these steps is illustrated for a generic transition event below:

Assume that a relation that maintains a running count of "e" events has already been set up. Let this event by "e-count". In that context, a transition event might be indicated by the fact that "e-count" exceeds 10 looks as below in Flea:

```
(defevent critical-e-count
    :transition
    ((timestamp a1 a2) s.t.
    (E (c) (and (start (e-count timestamp a1 a2 c))
        (> c 10)))))                                         [4]
```

Formula [4] is translated via Steps 318, 320, 322 as below:

```
Step 318: define a relation with the same signature as critical-e-count
(DEFRELATION critical-e-count :EQUIVS (= = =) :TYPES
    (TIMESTAMP ENTITY ENTITY) :TYPE-ENFORCEMENTS
    (:NONE :NONE :NONE) :POSSIBLETODELETE NIL)              [5]
Step 320: define a rule that will trigger when count exceeds 10
(DEFAUTOMATION ADD-critical-e-count
    ((TIMESTAMP a1 a2) S.T.
    (AND (CLOCK TIMESTAMP)
        (E (C)
            (AND (START (e-count timestamp a1 a2 C))
                (> C 6)))))
    :response #'response-critical-e-count-###)              [6]
Step 322: define the response for the above rule to do automatic assertions
(DEFUN response-critical-e-count-### (TIMESTAMP a1 a2)
    (++ critical-e-count timestamp a1 a2))                  [7]
```

The outputs of Steps 318, 320, and 322 concludes the translation of transition events as shown.

DETAILED EXAMPLE

The following example involves modeling of some of the events in an Internet security analysis package for computer crime detection or for personal use in the home. Events have to do with the arrival or departure of packets of information from a computer that is: being monitored. Typically, these events are generated by instrumenting low, packet-level functions in the operating system such as Windows. Parents or law-enforcement personnel will probably not be interested in looking at all packets, because of the volume of data. However, through intelligent event analysis, they can filter the event stream a) using FLEA (first order logic) and b) they can do this dynamically without any additional software changes.

The raw external events here are:

The events corresponding to a computer "logging in" or "logging out" are modeled as below respectively:
  (defevent computer-connected :external (timestamp string))
  (defevent computer-disconnected :external (timestamp string)) where the string represents the Internet address of the computer that is connecting or disconnecting as the case maybe.

Packets of information arrive or leave a computer. Each such occurrence is another legitimate external event (defevent packet :external (timestamp string))

where the first string is the Internet address, and the second string is the actual text of the packet.

We will parse the above relations using special purpose packet parsers. The results of these parsers are themselves viewed as relations that can participate in the pattern specifications. Examples of such relations are:

(defrelation packet-type :types (message string))
(defrelation packet-protocol :types (message string))

Also, there is a separate relation in which users can set up keywords dynamically:

(defrelation keyword :types (string))

Defining Events as Patterns Existing Events

The event pattern language is FLEA—it is First Order Logic with a few built-in patterns that are intended to be conveniences. The following can be defined in the pattern language:

- Events that are logical combinations (not, and, or) of other events
- Events that utilize existential quantification (E . . . ) and universal quantification (A . . . ) over the data in other events
- Events that involve built in patterns over the other events. The built-in patterns include:
  - (then e1 e2): the event of one event, e1, following another, e2, in time
  - (then-excluding e1 e2 e3): the event of one event, e1, following another, e2, in time without any events of type e3 between those occurrences.
  - (in-time e1 e2 interval): the event when an event e2 occurs within "interval" seconds of the event e1
  - (too-late e1 e2 interval deadline): the event when an e2 does not occur within "interval" seconds of the event e1, but occurs instead at the "deadline" time.
  - (seq e1 e2 . . . en :without d1 d2 . . . di :limit+ time+:limit− time−)
    - this composite event is the building block to reason about event sequences. It is the event when the first sequence, e1, e2, etc, through en occur in sequence.
    - If ":without" is specified, then this event occurs only if the e's occur in the specified sequence without any intervening d1, d2, etc through di.
    - Further if :limit+ is specified, the event occurs ONLY when the interval between the earliest and latest events is no more than time+.
    - If :limit− is specified, the event occurs ONLY when the interval between the earliest and latest events is greater than time−.

Examples of Defining and Compiling General Event Patterns in First Order Logic Incoming packets are defined as packets where the "direction" is "INCOMING"

```
(defevent incoming-packet
    :definition
    ((timestamp address message)
    s.t.
    (and (packet timestamp address message)
        (packet-type message "INCOMING"))))
```

Incoming email packets are those incoming packets where the protocol is "SMTP"—the common Internet mailing protocol:

```
(defevent incoming-email-packet
    :definition
    ((timestamp address message) s.t.
    (and (incoming-packet timestamp address message)
        (packet-protocol message "SMTP"))))
```

An incoming email packet that contains one of the defined keywords is described as below:

```
(defevent keyword-incoming-email-event
    :definition
    ((timestamp address message word) s.t.
    (and (incoming-email-packet timestamp address message)
        (keyword word))))
```

The above events use the logical connectives of the First Order Logic. These are directly translated into derived relations of the underlying database as described in FIG. 4.

The following illustrates the process of defining event patterns using predefined event patterns in accordance with the teachings of the present invention:

```
(defevent two-same-keyword-email-events
    :definition
    ((timestamp address word) s.t.
    (then (keyword-incoming-email-event $ address $ word)
        (keyword-incoming-email-event timestamp address $ word))))
(defevent two-same-keyword-events-in-same-session
    :definition
    ((timestamp address word)
    s.t.
    (then-excluding
    (keyword-incoming-email-event $ address $ word)
    (keyword-incoming-email-event timestamp address $ word)
    (computer-disconnected $ address))))
(defevent two-keyword-events-in-a-minute
    :definition
    ((timestamp address)
    s.t.
    (in-time
    (keyword-incoming-email-event $ address $ $)
    (keyword-incoming-email-event timestamp address $ $)
    60)))
(defevent two-keyword-events-outside-an-hour
    :definition
    ((timestamp address)
    s.t.
    (too-late
    (keyword-incoming-email-event $ address $ $)
    (keyword-incoming-email-event timestamp address $ $)
    3600
    18000)))
```

The following illustrates the process of compilation of pre-defined event patterns into (SEQ . . . ) in accordance with the present teachings.

```
(then (keyword-incoming-email-event $ address $ word)
    (keyword-incoming-email-event timestamp address $ word))
    →
(SEQ (KEYWORD-INCOMING-EMAIL-EVENT $ ADDRESS $ WORD)
    (KEYWORD-INCOMING-EMAIL-EVENT  TIMESTAMP  ADDRESS $ WORD) :WITHOUT
    (KEYWORD-INCOMING-EMAIL-EVENT  $  ADDRESS  $  WORD)
    (KEYWORD-INCOMING-EMAIL-EVENT $ ADDRESS $ WORD))
(then-excluding (keyword-incoming-email-event $ address $ word)
        (keyword-incoming-email-event timestamp address $ word)
        (computer-disconnected $ address))
    →
(SEQ (KEYWORD-INCOMING-EMAIL-EVENT $ ADDRESS $ WORD)
    (KEYWORD-INCOMING-EMAIL-EVENT TIMESTAMP ADDRESS   $   WORD) :WITHOUT
    (COMPUTER-DISCONNECTED $ ADDRESS)
        (KEYWORD-INCOMING-EMAIL-EVENT $ ADDRESS $ WORD)
        (KEYWORD-INCOMING-EMAIL-EVENT $ ADDRESS $ WORD))
(in-time   (keyword-incoming-email-event $ address $ $)
    (keyword-incoming-email-event timestamp address $ $)
    60)
    →
(SEQ :LIMIT+60
    (KEYWORD-INCOMING-EMAIL-EVENT $ ADDRESS $ $)
    (KEYWORD-INCOMING-EMAIL-EVENT TIMESTAMP ADDRESS $ $))
(too-late (keyword-incoming-email-event timestamp address $ $)
    (keyword-incoming-email-event $ address $ $)
    3600
    18000)
    →
(SEQ :LIMIT- 3600
    (KEYWORD-INCOMING-EMAIL-EVENT TIMESTAMP ADDRESS $ $)
    :WITHOUT
    (KEYWORD-INCOMING-EMAIL-EVENT $ ADDRESS $ $)
    :LIMIT-VAR 18000)
```

The following illustrates the process of translating (SEQ . . . ) into first order logic in accordance with the present teachings:

```
(SEQ
    (KEYWORD-INCOMING-EMAIL-EVENT $ ADDRESS $ WORD)
    (KEYWORD-INCOMING-EMAIL-EVENT TIMESTAMP ADDRESS $ WORD)
    :WITHOUT
    (KEYWORD-INCOMING-EMAIL-EVENT $ ADDRESS $ WORD)
    (KEYWORD-INCOMING-EMAIL-EVENT $ ADDRESS $ WORD))
    →
(E (TIME1726)
(AND (KEYWORD-INCOMING-EMAIL-EVENT TIME1726 ADDRESS $ WORD)
    (KEYWORD-INCOMING-EMAIL-EVENT  TIMESTAMP  ADDRESS $ WORD)
    (<TIME1726 TIMESTAMP)
    (NOT (E (TIME1724)
        (AND (<TIME1726 TIME1724) (< TIME1724 TIMESTAMP)
            (KEYWORD-INCOMING-EMAIL-EVENT TIME1724 ADDRESS $ WORD))))
    (NOT (E (TIME1725)
        (AND (< TIME1726 TIME1725) (< TIME1725 TIMESTAMP)
            (KEYWORD-INCOMING-EMAIL-EVENT TIME1725 ADDRESS $ WORD))))))
(SEQ :LIMIT+60 (KEYWORD-INCOMING-EMAIL-EVENT $ ADDRESS $ $)
    (KEYWORD-INCOMING-EMAIL-EVENT TIMESTAMP ADDRESS $ $))
    →
    (E (DEADLINE1753 TIME1752)
    (AND (KEYWORD-INCOMING-EMAIL-EVENT TIME1752 ADDRESS $ $)
        (KEYWORD-INCOMING-EMAIL-EVENT TIMESTAMP ADDRESS $ $)
        (< TIME1752 TIMESTAMP)
        (AND (+ TIME1752  60  DEADLINE1753) (< TIMESTAMP DEADLINE 1753))))
```

Schematic of SoMoS Notification System

SoMoS is an event correlation system intended to notify any application only about the events that the application is truly interested in. SoMoS follows a "subscribe" paradigm that is common in the field to notify interested clients. Clients subscribe to the named event types, and will be notified only if those events actually occur. Client notifications are handled via new rules that are compiled into the server as shown in FIG. 6.

Figure 6:
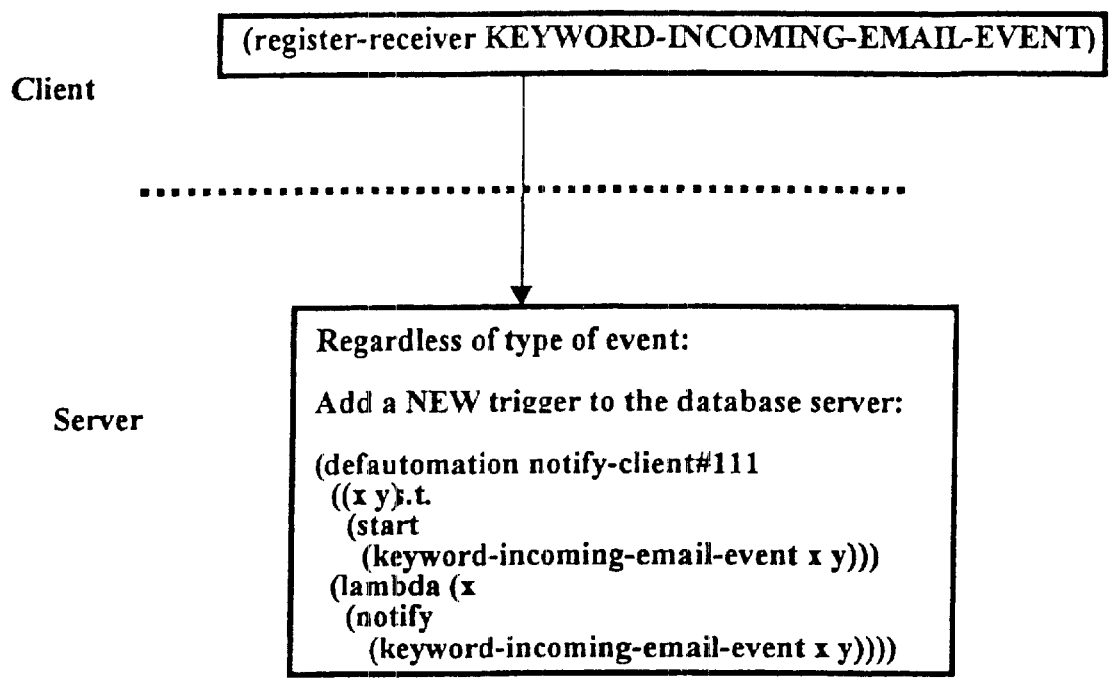
FIG. 6 is a diagram which illustrates how client subscriptions turn into notifications in accordance with the teachings of the present invention.

FIG. 6 is a diagram which illustrates how client subscriptions turn into notifications in accordance with the teachings of the present invention. As shown in FIG. 6, a potential receiver sends the "(register-receiver . . . )" request to the server, with a specific event. The receiver is essentially subscribing to that event, and will be notified automatically when those events occur.

Thus, the present invention has been described herein with reference to a particular embodiment for a particular application. Using the above teachings, one of ordinary skill in art should be are able to provide a sophisticated event and data fusion service. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An event monitoring and correlation system comprising:

first means for detecting the occurrence of a predetermined event from a first source and providing data in response thereto;

second means for processing event data as a data relation in a database;

said second means includes means for recording a plurality of events as data relations in said database;

said second means for recording a plurality of events as data relations being an event pattern language;

said event pattern language expressing events in terms of first order logic over a universe of events;

said event pattern language including means for identifying at least one commonly occurring pattern; and said pattern allowing for additional event pattern events to be specified dynamically.

2. The invention of claim 1 wherein said event pattern language is a Formal Language for Expressing Assumptions (FLEA).

3. The invention of claim 1 further including means for compiling event patterns representative of data relations into the database.

4. The invention of claim 3 further including means for automatically triggering responses when specific patterns of events are stored in the database.

5. The invention of claim 3 wherein the event compiler is a SOMOS compiler.

6. The invention of claim 1 further including means for recognizing event patterns in said database by dynamically formulating queries into said database using a standard query language.

7. The invention of claim 6 wherein said standard query language is SQL.

8. An event monitoring and correlation system comprising:

monitor means for detecting the occurrence of a predetermined event from a first source and providing data in response thereto;

second means for processing said event data as a data relation in a database, said second means including:

third means for recording a plurality of events as data relations in said database using an event pattern language that expresses events in first order logic over a universe of events;

fourth means for compiling event patterns representative of data relations into the database;

processor means for comparing said data to said compiled event patterns and providing an output in response the receipt of a predetermined pattern of events;

said event pattern language including means for identifying at least one commonly occurring pattern; and said pattern allowing for additional event pattern events to be specified dynamically.

9. The invention of claim 8 wherein said event pattern language is a Formal Language for Expressing Assumptions (FLEA).

10. The invention of claim 8 further including means for compiling event patterns representative of data relations into the database.

11. The invention of claim 10 further including means for automatically triggering responses when specific patterns of events are stored in the database.

12. The invention of claim 11 wherein the event compiler is a SOMOS compiler.

13. The invention of claim 8 further including means for recognizing additional event patterns in said database by dynamically formulating queries into said database using a standard query language.

14. The invention of claim 13 wherein said standard query language is SQL.

* * * * *